(12) United States Patent
Penner et al.

(10) Patent No.: US 10,507,610 B2
(45) Date of Patent: Dec. 17, 2019

(54) SOFT WRAP SUBSTRATE

(75) Inventors: Benjamin Warren Penner, Ann Arbor, MI (US); Kerry Scott Zellner, Jr., Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 970 days.

(21) Appl. No.: 13/432,514

(22) Filed: Mar. 28, 2012

(65) Prior Publication Data
US 2013/0260098 A1 Oct. 3, 2013

(51) Int. Cl.
B29C 45/00 (2006.01)
B29L 31/30 (2006.01)

(52) U.S. Cl.
CPC .. B29C 45/0025 (2013.01); *B29C 2045/0043* (2013.01); *B29L 2031/3005* (2013.01); *Y10T 428/24479* (2015.01)

(58) Field of Classification Search
CPC ..... Y10T 428/24479; Y10T 428/24612; B32B 3/30; B32B 37/02–03; B60K 37/04
USPC ............. 428/156, 141, 167, 159, 33; 296/70
See application file for complete search history.

(56) References Cited

U.S. PATENT DOCUMENTS

| 5,439,365 | A | 8/1995 | Hendry |
| 6,004,498 | A * | 12/1999 | Fujii ................... B29C 37/0057 264/255 |
| 6,432,350 | B1 | 8/2002 | Seres et al. |
| 6,550,835 | B2 * | 4/2003 | Davis, Jr. ............... B60K 37/00 296/37.12 |
| 7,155,865 | B2 * | 1/2007 | Rosenberg ..................... 52/79.9 |
| 7,503,608 | B1 * | 3/2009 | Shahidehpour ........ B60K 37/00 296/29 |
| 2002/0043760 | A1 * | 4/2002 | Gallant ..................... 273/157 R |
| 2008/0057286 | A1 | 3/2008 | Polk et al. |
| 2008/0107889 | A1 * | 5/2008 | Fox ............................ 428/319.7 |
| 2008/0169685 | A1 * | 7/2008 | Hedderly ................. 296/203.01 |
| 2009/0174216 | A1 * | 7/2009 | Penner ................. B62D 25/145 296/72 |
| 2011/0151271 | A1 | 6/2011 | Keys |
| 2011/0240177 | A1 | 10/2011 | Eberlein |

FOREIGN PATENT DOCUMENTS

WO    WO 2011003417 A1 *   1/2011

OTHER PUBLICATIONS

Puzz3D Taj Mahal, Wrebbit Inc. 1996; Milton Bradley Company.*
Plastics Part Design and Mouldability, pp. 1-18, 2008. http://www.pitfallsinmolding.com/partdesign1.html.*

* cited by examiner

*Primary Examiner* — Frank J Vineis
*Assistant Examiner* — Alicia J Sawdon
(74) *Attorney, Agent, or Firm* — Dinsmore & Shohl LLP

(57) ABSTRACT

A molded component having a thickness reduction feature is provided. The molded component can include an injection molded polymer substrate having a front panel, a side panel, and a corner between and adjoining the front panel and the side panel. The substrate can also have a groove extending along the corner between the front panel and the side panel, the groove having a front panel edge and a side panel edge. The front panel edge and/or side panel edge have a dentil profile edge, the dentil profile edge reducing an effective thickness of the corner and thus providing increased or controlled cooling of the substrate.

16 Claims, 3 Drawing Sheets

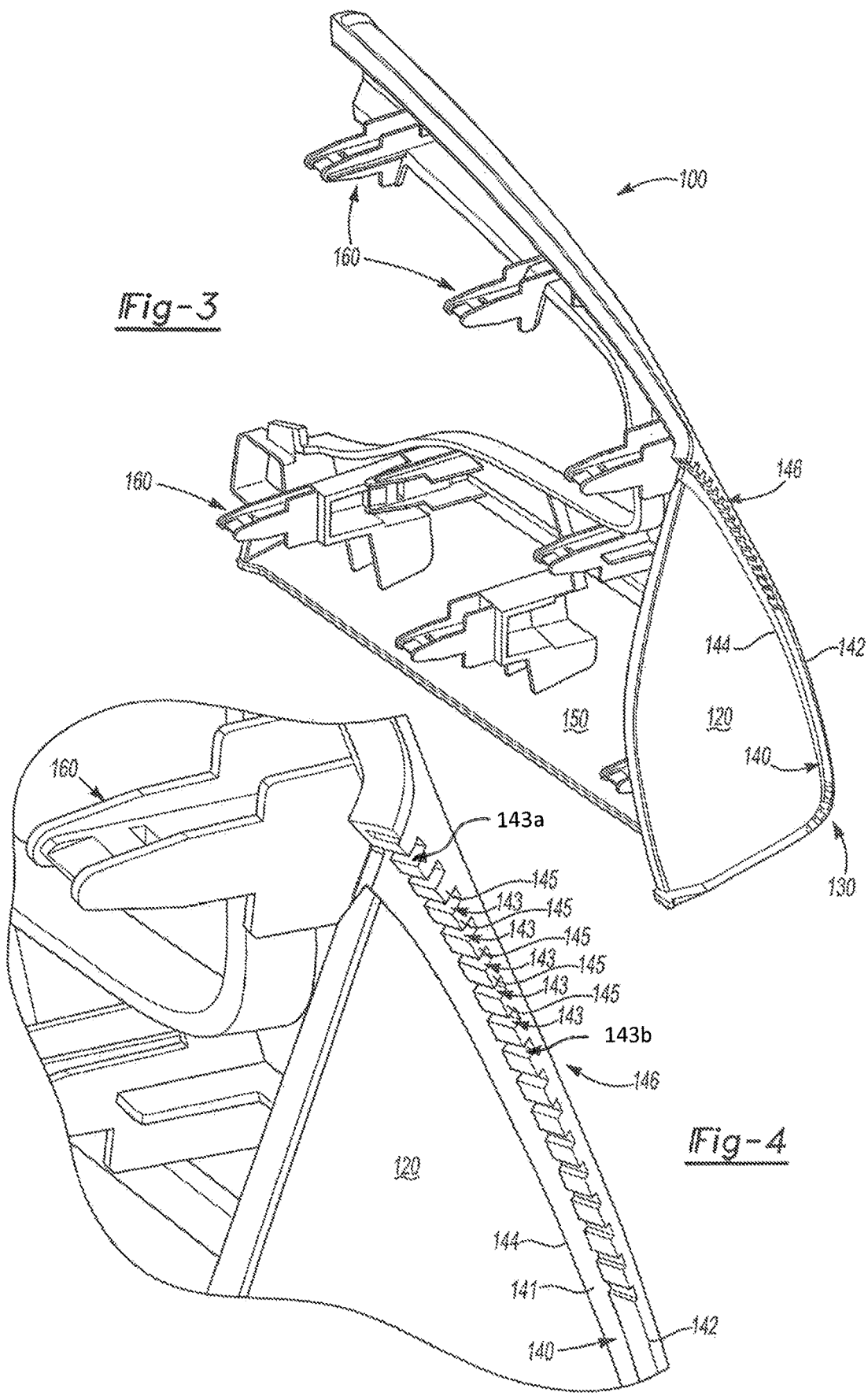

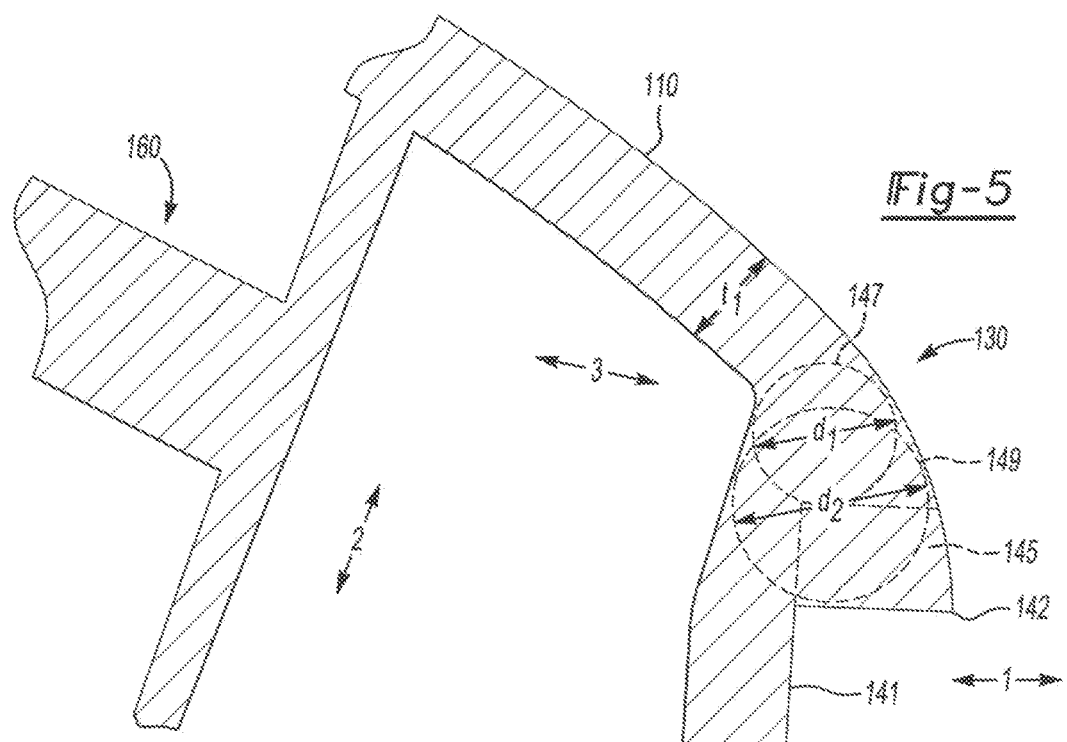

SOFT WRAP SUBSTRATE

FIELD OF THE INVENTION

The present invention is related to an injection molded polymer substrate having a soft wrap cover, and in particular, an injection molded polymer substrate with a groove that has a dentil profile edge or wall.

BACKGROUND OF THE INVENTION

The use of molded polymer substrates for structural components is known. In addition, a molded polymer substrate can be covered with a flexible sheet material, sometimes referred to as a soft wrap, such that a component with a desirable outer surface appearance, touch, and the like is provided.

It is also known that the soft wrap can be made from multiple pieces that are attached together with a seam therebetween in order to provide an outer flexible layer with a shape that fits around an arcuate portion of the substrate such as a corner. In addition, the underlying substrate can have a groove for the seam of the soft wrap cover to be pushed or stuffed at least partially therein and thereby afford a tight fit of the soft wrap cover over and/or across the underlying substrate.

It is appreciated that such molded polymer substrates can be injection molded components produced by an injection molding machine as known to those skilled in the art. The injection molding machine typically has at least two opposing dies that, when brought together, form a die cavity having a shape of the substrate. In the event that the injection molded polymer substrate has a relatively thick section, e.g. a corner between two generally planar panels, controlled cooling of the thick section is required in order to prevent cooling or sink defects at or proximate to the thick section, voids within the thick section, and the like. Such controlled cooling can increase production cycle times for producing the polymer substrate, the increased cycle times being undesirable.

Therefore, a molded component having a thickness reduction feature that alleviates increased cycle times and yet provides adequate structural support to a substrate would be desirable. In addition, in the event that such a thick section is proximate to a groove in the substrate where a seam of a soft wrap cover will be located, the ability to maintain the location of the groove at such a corner would also be desirable.

SUMMARY OF THE INVENTION

A molded component having a thickness reduction feature is provided. The molded component can include an injection molded polymer substrate having a front panel, a side panel, and a corner between and adjoining the front panel and the side panel. The substrate can also have a groove extending along the corner between the front panel and the side panel, the groove having a front panel edge or wall and a side panel edge or wall. In addition, the front panel edge and/or the side panel edge can have a dentil profile, the dentil profile reducing an effective thickness of the corner.

The dentil profile edge or wall can have a plurality of spaced apart cavities extending into the edge with a plurality of spaced apart blocks between the plurality of spaced apart cavities. In addition, the front panel and/or the side panel can have a panel thickness t and the corner can have a thickness of less than 1.5t at locations where the plurality of spaced apart cavities extend into the dentil profile edge and a thickness of greater than 1.5t at the location of the plurality of spaced apart blocks.

A flexible sheet often referred to as a soft wrap can also be included, the soft wrap extending across the injection molded substrate. In some instances, the soft wrap has a seam located at least partially within the substrate groove. The injection molded polymer substrate can be made from a thermoplastic polymer such as low density polyethylene (LDPE), high density polyethylene (HDPE), polypropylene (PP), acrylonitrile-butadiene-styrene (ABS), polymethylmethacrylate (PMMA), polytetrafluoroethylene (PTFE), polyethylene terephthalate (PET), polyamide (Nylon 6), polyimide (PI), polycarbonate (PC), polysulfone (PSF), polyamide-imide (PAI) and the like. In addition, the soft wrap can be a bi-laminate material, e.g. a skin-foam bi-laminate material.

A process for making an injection molded substrate is also provided, the process including providing an injection molding machine having at least one die shaped to form a mold cavity for the production of the injection molded substrate. The cavity affords for the injection molded substrate to have a first panel, a second panel extending at an angle from the first panel, and a corner extending between the first panel and the second panel. A groove extends along the corner and has a first panel edge or wall adjacent to the first panel and a second panel edge or wall adjacent to the second panel. The injection molded substrate also has a dentil profile extending along the first panel edge and/or the second panel edge in order to create a dentil profile edge or wall bounding the groove. The dentil profile edge can have a plurality of spaced apart cavities extending into the edge with a substrate block between each of the cavities.

The process also includes injecting a thermoplastic polymer into the mold cavity and forming the desired injection molded substrate with the dentil profile edge. Thereafter, the injection molded substrate is removed from the at least one die with the dentil profile edge reducing the effective thickness of, and preventing a cooling defect from forming at, the corner. The process can also include providing a soft wrap with a seam and wrapping the soft wrap around the injection molded substrate and inserting the seam at least partially within the groove.

BRIEF DESCRIPTION OF THE DRAWINGS

FIG. 3 is a rear perspective view of the underlying substrate shown in FIG. 2;

FIG. 4 is an enlarged view of a corner region of the underlying substrate shown in FIG. 3;

FIG. 5 is a side cross-sectional view of the corner region shown in FIG. 4; and

FIG. 6 is a side cross-sectional view of the molded component illustrating a soft wrap with a seam attached to the underlying substrate.

DETAILED DESCRIPTION OF THE INVENTION

Figure 1:
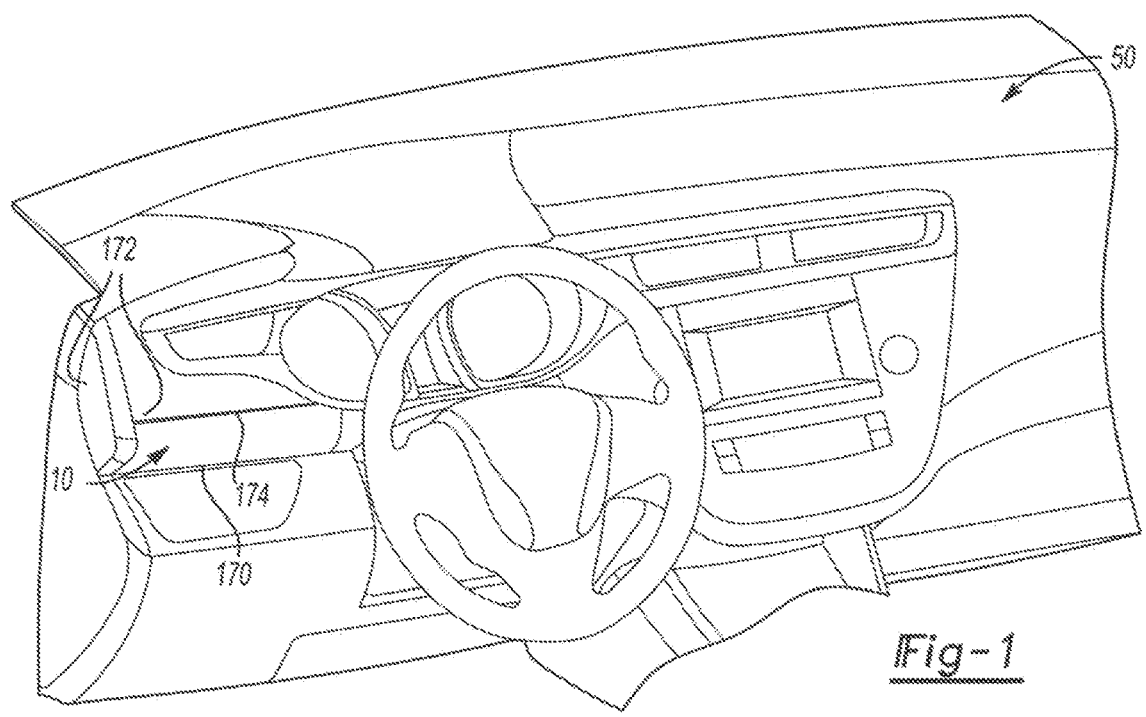
FIG. 1 is a perspective view of a molded component having an underlying substrate with a soft wrap material extending thereover.

A molded component having a groove such that a soft wrap cover can be wrapped around and attached to the molded component is provided. As such, the molded component has utility as a component or part for a motor vehicle.

The molded component can include an injection molded polymer substrate that has at least two panels with a corner therebetween. The substrate is designed to be covered with a flexible sheet material such as or known as a soft wrap in order to provide an aesthetically pleasing component for use by a consumer. In some instances, the component with the soft wrap can be part of a motor vehicle, for example, part of an instrument panel for the motor vehicle.

The injection molded polymer substrate can have one or more grooves that allow for seams of the soft cover to be located at least partially therewithin as is known to those skilled in the art. In addition, one of the grooves can extend along the corner between two substrate panels. In order to reduce the effective thickness of the corner and thereby eliminate cooling defects at the corner region, a corner edge or wall that bounds the groove can have a dentil profile.

The dentil profile has a plurality of spaced apart cavities that extend into the edge or wall and a block of the substrate present between each of the spaced apart cavities. This "dentil profile edge" can have a thickness that is less than 1.5 times the thickness of one or more adjoining panels at locations where the plurality of spaced apart cavities are present and a thickness of greater than 1.5 times the thickness of the one or more adjoining panels where the substrate blocks are present between the cavities. This alternating thickness at the corner region provides a reduction in the effective thickness thereof and thus provides controlled cooling of the corner without the need for increased production cycle times during the manufacture of injection molded polymer substrates.

The soft wrap can have seams that are located and run along the one or more grooves of the polymer substrate when the soft wrap is wrapped around the component as known to those skilled in the art. In addition, at least part of the seams can be located, pushed, or shoved into the one or more grooves in order to securely attach the soft wrap to the substrate and/or provide a tight fit of the soft wrap onto the substrate. It is appreciated that the dentil profile edge can also be used for injection molded substrates made from non-ferrous metallic materials such as zinc alloys, magnesium alloys, aluminum alloys, copper alloys and the like using processes, techniques, etc. such as die casting, semi-solid casting and/or semi-solid molding.

The injection molded polymer substrate can be made from a thermoplastic polymer such as low density polyethylene (LDPE), high density polyethylene (HDPE), polypropylene (PP), acrylonitrile-butadiene-styrene (ABS), polymethyl-methacrylate (PMMA), polytetrafluoroethylene (PTFE), polyethylene terephthalate (PET), polyamide (Nylon 6), polyimide (PI), polycarbonate (PC), polysulfone (PSF), polyamide-imide (PAI) and the like. In addition, the soft wrap can be a bi-laminate material, e.g. a skin-foam bi-laminate material.

Figure 2:
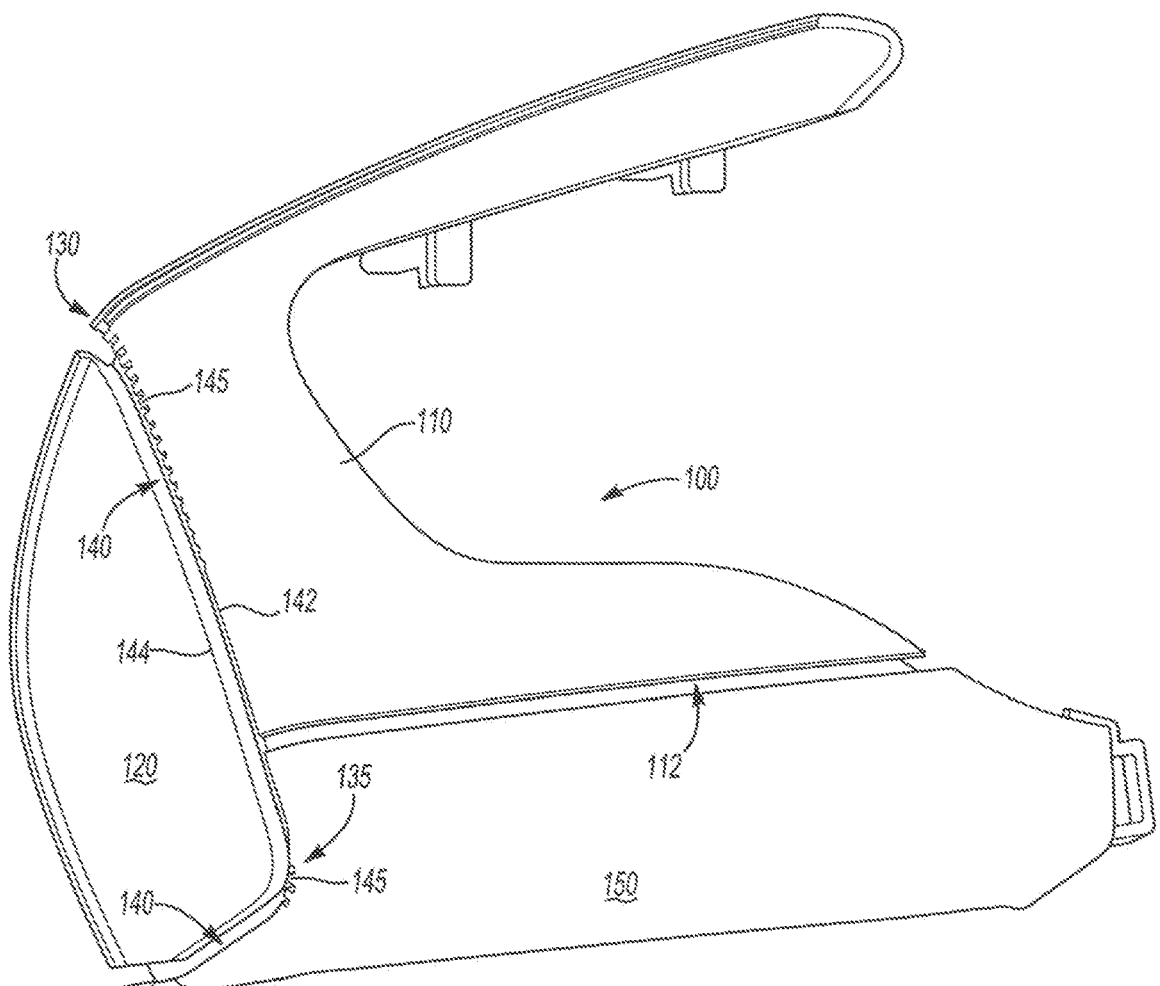
FIG. 2 is a front perspective view of the underlying substrate according to an embodiment of the present invention.

Turning now to FIG. 1, a perspective view of a molded component according to an embodiment of the present invention is shown generally at reference numeral 10. The component 10 can be part of an instrument panel 50, however this is not required. In addition, the component 10 has a flexible sheet cover, also referred to as a soft wrap 170, that is made from one or more pieces 172 that are joined together with one or more seams 174. Underneath the soft wrap 170 can be a molded or cast substrate 100 as shown in FIG. 2.

In some instances, the substrate 100 is an injection molded substrate and can be an injection molded polymer substrate. The substrate 100 can have a front or first panel 110 and a side or second panel 120 that extends or is oriented at an angle to the first panel 110. Between the first panel 110 and the second panel 120 can be a corner 130 and a groove 140 can extend along the corner 130. In some instances, the groove 140 is located between the first panel 110 and the second panel 120, however this is not required. Stated differently, the groove 140 can be located completely within the first panel 110 or completely within the panel 120. In any event, the groove 140 can have a first panel edge 142 and a second panel edge 144. Furthermore, the groove 140 can have a bottom 141 as shown in FIGS. 4 and 5.

The substrate 100 can also have a bottom or third panel 150 with the groove 140 extending along a corner 135. Additional grooves such as groove 112 can also be present with at least part of the seams 174 of the soft wrap 170 located therein. As illustrated in FIG. 2, the corner 130 can be a first corner between the first panel 110 and the second panel 120. Also, a second corner is present between the third panel 150 and the second panel 120, and the corner 135 can be third corner between and adjoining the first corner and the second corner.

Turning now to FIGS. 3 and 4, the substrate 100 can have an opposite or back side with one or more clips 160 such that the substrate can be attached to a separate component. In addition, at least one of the groove edges or walls, e.g. the first panel edge 142, can have a dentil profile 146 that extends along at least part of the edge. As shown in greater detail in FIG. 4, the dentil profile 146 can have a plurality of spaced apart cavities 143 that extend in a widthwise direction of the groove 140 into the edge 142 with a block 145 of the substrate 100 being present between each of the cavities 143. Although the dentil profile 146 is shown as alternating rectangular-shaped cavities and blocks, this is not required. Stated differently, the plurality of spaced apart cavities 143 and/or the blocks 145 can have any geometrical shape that provides alternating thin and thick regions at the corner 130. With such alternating thin and thick regions at the corner 130, the effective thickness of the corner is reduced and cooling defects at this location or region can be prevented. As can be seen, the cavities 143 have widths measured from the edge 142 into the groove 140 that gradually decrease along a length of the groove 140. As an example, a width of cavity 143a is greater than a width of cavity 143b.

For example, FIG. 5 shows a side cross-sectional view of the first panel 110, second panel 120, corner 130, and groove 140. The first panel 110 can have a thickness of $t_1$ and the second panel 120 can have a thickness of $t_2$. In some instances, the thicknesses $t_1$ and $t_2$ are equal, however this is not required. In addition, the region of corner 130 where a cavity 143 is present will have a thickness 147 or diameter of $d_1$, while the region of the corner 130 where a block 145 is present will have a thickness 149 or diameter of $d_2$.

It is appreciated from FIG. 5 that diameter $d_1$ is less than $d_2$ and in some instances the diameter $d_1$ is less than 1.5 times the thickness $t_1$ and/or $t_2$. In addition, the diameter $d_2$ can be greater than the thickness $t_1$ and/or $t_2$. It is appreciated that such a criterion, i.e. a thickness or diameter of the corner 130 being less than $1.5t_1$ or $1.5t_2$, allows for controlled cooling of the corner 130 after the substrate 100 has been injection molded such that increased cycle times for the production of such a component are not required.

In addition to the above, typical die movements during the injection molding process are indicated by the double-headed arrows 1 and 2. In the event that a die were to be used to provide a cavity on the back side of panel 110 and/or corner 130 in order to reduce the corner thickness, the double-headed arrow 3 illustrates the restricted die movement that would be present due to the clip 160. As such, the dentil profile as disclosed herein allows for the manufacture of an injection molded polymer substrate with a reduced corner thickness without the design and/or use of special tooling, increased cycle times, two step molding processes, and the like. Stated differently, the dentil profile 146 along at least one of the edges for groove 140 allows for design and manufacture of a substrate with reduce cross-section thickness(es), but without major redesign of dies, injection molding processing, and the like. It is appreciated from the figures that the substrate is an integrally molded component, i.e. a single injection molded substrate.

Turning now to FIG. 6, the soft wrap 170 can have seam 174 located at least partially within the groove 140. In this manner, the soft wrap 170 can be desirably located and positioned relative to the substrate 100 with a "tight" fit therebetween.

It is appreciated that the above disclosed embodiment(s) has been for illustrative purposes only and that changes, alterations, and the like will be obvious to one skilled in the art having knowledge of the teachings herein. As such, the embodiment(s) discussed above is not meant to limit the scope of the invention in any way and it is the claims, including all equivalents, which do define the scope of the invention.

We claim:

1. A molded component comprising:
    a single injection molded polymer substrate for a motor vehicle, said single injection molded polymer substrate having a front panel with a thickness $t_1$, a side panel with a thickness $t_2$ and extending from said front panel at an angle, a bottom panel extending from said front panel and said side panel, wherein said front panel, side panel and bottom panel are molded together as said single injection molded polymer substrate, a first corner between and adjoining said front panel and said side panel, a second corner between and adjoining said bottom panel and said side panel, and a third corner between and adjoining said first corner and said second corner, said first corner having an effective thickness greater than thickness $t_1$ and thickness $t_2$; and
    a groove extending along said first corner between said front panel and said side panel, said groove also extending along said second corner and said third corner, said groove extending along said first corner having a front panel edge and a side panel edge with at least one of said front panel edge and said side panel edge having alternating and repeating blocks of spaces, said alternating and repeating blocks of spaces reducing said effective thickness of said first corner and providing controlled cooling of said first corner during injection molding of said single injection molded polymer substrate;
    wherein the alternating and repeating blocks of spaces form a dentil profile edge that extends into the groove whereby the groove has an increased width at each block of space in a repeating fashion;
    wherein widths of the repeating blocks of spaces gradually decrease along a length of the groove forming the dentil profile edge that is curved along the length of the groove.

2. The molded component of claim 1, wherein said single injection molded polymer substrate is part of an instrument panel for the motor vehicle.

3. The molded component of claim 2, wherein a thickness of said first corner is less than $1.5t_1$ locations where said at least one of said front panel edge and said side panel edge has said alternating and repeating blocks of spaces.

4. The molded component of claim 3, further comprising a soft wrap extending across said single injection molded substrate, said soft wrap having a seam located at least partially within said groove.

5. The molded component of claim 1, wherein said single injection molded polymer substrate is made from a thermoplastic polymer selected from a group consisting of low density polyethylene (LDPE), high density polyethylene (HDPE), polypropylene (PP), acrylonitrile-butadiene-styrene (ABS), polymethylmethacrylate (PMMA), polytetrafluoroethylene (PTFE), polyethylene terephthalate (PET), polyamide (Nylon 6), polyimide (PI), polycarbonate (PC), polysulfone (PSF) and polyamide-imide (PAI).

6. The molded component of claim 1, wherein said injection molded polymer substrate has a back side with one or more clips for attaching said injection molded polymer substrate to a separate component.

7. A single molded component for a motor vehicle with a corner having a reduced effective thickness, said single molded substrate comprising:
    a first panel with a thickness $t_1$ and a back side with one or more clips for attaching said single molded substrate to a separate component, a second panel with a thickness $t_2$ and extending at an angle from said first panel, a third panel extending from said first panel and said second panel, a first corner extending between said first panel and said second panel, a second corner extending between said third panel and said second panel, and a third corner extending between said first corner and said second corner, said first corner having an effective thickness greater than thickness $t_1$ and thickness $t_2$;
    a groove extending along said first corner between said first panel and said second panel, said grove also extending along said second corner and said third corner, said groove extending along said first corner having a first panel edge adjacent said first panel and a second panel edge adjacent said second panel; and
    alternating and repeating blocks of spaces extending along at least one of said first panel edge and said second panel edge of said groove and forming a dentil profile edge, said dentil profile edge reducing said effective thickness of said first corner and providing controlled cooling of said first corner during injection molding of said single molded substrate;
    wherein the alternating and repeating blocks of spaces form the dentil profile edge that extends into the groove whereby the groove has an increased width at each block of space in a repeating fashion;
    wherein widths of the repeating blocks of spaces gradually decrease along a length of the groove forming the dentil profile edge that is curved along the length of the groove.

8. The single molded component of claim 7, further comprising a soft wrap extending across said first panel and said second panel, said soft wrap having a seam located at least partially within said groove.

9. The single molded component of claim 8, wherein said first panel and said second panel with said soft wrap is an instrument panel component for the motor vehicle.

10. The single molded component of claim 9, wherein said injection molded substrate is made from a thermoplastic polymer selected from a group consisting of low density polyethylene (LDPE), high density polyethylene (HDPE), polypropylene (PP), acrylonitrile-butadiene-styrene (ABS), polymethylmethacrylate (PMMA), polytetrafluoroethylene (PTFE), polyethylene terephthalate (PET), polyimide (Nylon 6), polyimide (PI), polycarbonate (PC), polysulfone (PSF) and polyimide-imide (PAI).

11. A process for making an injection molded substrate comprising:

providing an injection molding machine having at least one die shaped to form a mold cavity for an injection molded substrate having:

a first panel, a second panel extending at an angle from the first panel and a corner extending between the first panel and the second panel;

a groove extending along the corner, the groove having a first panel edge adjacent the first panel and a second panel edge adjacent the second panel; and a dentil profile extending along at least one of the first panel edge and the second panel edge in order to create a dentil profile edge bounding the groove, the dentil profile edge having a plurality of spaced apart cavities extending into the dentil profile edge with a block between each of the plurality of spaced apart cavities, wherein the plurality of spaced apart cavities form the dentil profile edge that extends into the groove whereby the groove has an increased width at each cavity in a repeating fashion;

wherein widths of the plurality of spaced apart cavities gradually decrease along a length of the groove forming the dentil profile edge that is curved along the length of the groove;

injecting a thermoplastic polymer into the mold cavity and forming the injection molded substrate with the dentil profile edge; and removing the injection molded substrate from the at least one die, the dentil profile edge reducing the effective thickness of the corner and preventing a cooling defect from forming at the corner.

12. The process of claim 11, wherein the plurality of spaced apart cavities are thin corner regions and the plurality of spaced apart blocks are thick corner regions.

13. The process of claim 12, wherein the first panel has a thickness t, the thin corner regions have a thickness less than 1.5t and the thick corner regions have a thickness greater than 1.5t.

14. The process of claim 13, further including providing a soft wrap with a seam and wrapping the soft wrap around the injection molded substrate and inserting the seam at least partially within the groove.

15. The process of claim 14, wherein the injection molded polymer substrate with the soft wrap is an instrument panel component.

16. The process of claim 15, wherein the thermoplastic polymer is selected from a group consisting of low density polyethylene (LDPE), high density polyethylene (HDPE), polypropylene (PP), acrylonitrile-butadiene-styrene (ABS), polymethylmethacrylate (PMMA), polytetrafluoroethylene (PTFE), polyethylene terephthalate (PET), polyimide (Nylon 6), polyimide (PI), polycarbonate (PC), polysulfone (PSF) and polyimide-imide (PAI).

* * * * *